Oct. 5, 1965  W. L. THURLOW  3,210,040
FAUCET ADAPTER
Filed Dec. 7, 1961  2 Sheets-Sheet 1

INVENTOR
W. L. THURLOW
BY
ATTORNEY

Oct. 5, 1965  W. L. THURLOW  3,210,040
FAUCET ADAPTER
Filed Dec. 7, 1961  2 Sheets-Sheet 2
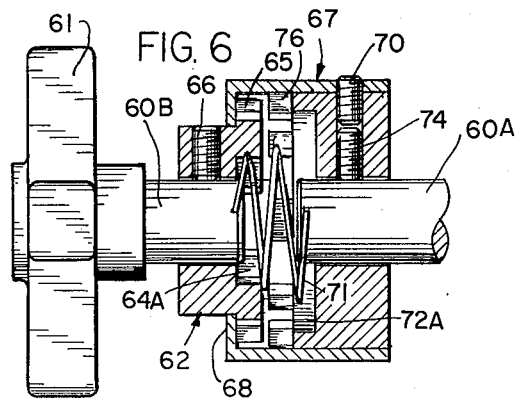
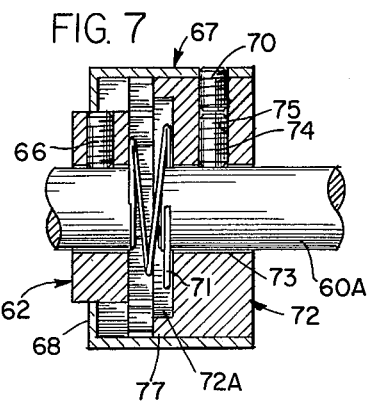
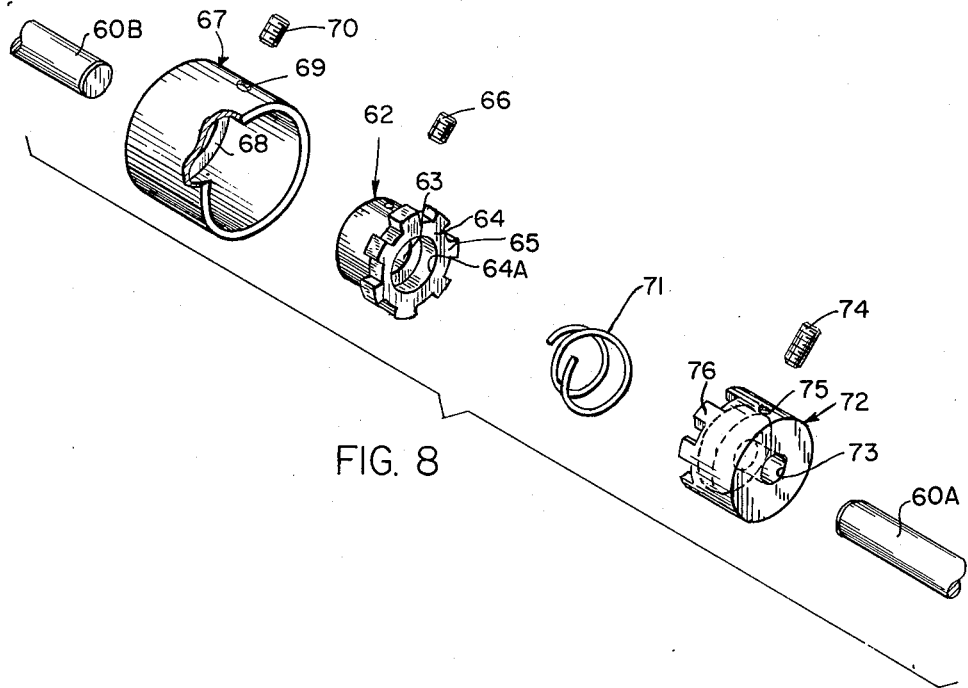
INVENTOR
W. L. THURLOW
BY
*Ayala Dowell*
ATTORNEY

United States Patent Office 3,210,040
Patented Oct. 5, 1965

3,210,040
FAUCET ADAPTER
William Lloyd Thurlow, 705 2nd St. N.,
Wahpeton, N. Dak.
Filed Dec. 7, 1961, Ser. No. 157,736
11 Claims. (Cl. 251—96)

This invention relates to the comfort, protection and welfare of man, including the distribution of electricity, water, gas, and other fluids and supplies at various temperatures for various uses and sometimes at temperatures high enough to cause bodily injury and therefore hazardous, especially to small children.

The invention relates especially to controls for a shaft such as the stem of a valve by which the passage of water illuminating and heating gas and other fluids is regulated and including structures designed to conserve the fluids and which cannot easily or accidentally be manipulated so that fluid will be conserved and so that persons, particularly small children, will not be injured from escaping fluid.

In public and other places valves have been installed which automatically cut off the fluid after use, and other valves have been employed which require a particular operation to cause them to open, such as safety valves for gas lines. Prior structures have been complicated, expensive, and unreliable. Also they have been of limited application, frail, and troublesome.

An object of the present invention is to provide a valve operating structure which can be readily applied to existing valves to prevent unintentional use of such valves.

Another object is to provide a disconnectable shaft operating structure which can easily be applied to an existing control shaft by a simple action on the part of the user.

It is a further object of the invention to provide a simple, inexpensive, durable, and dependable safety faucet adapter by which positive operation of a faucet or valve may be easily accomplished but at other times the operating means therefor may rotate freely requiring a predetermined force to operate and not being susceptible of operation by children below a predetermined age and physical capabilities or operated absent-mindedly or inadvertently.

A further object of the invention is to provide faucet operating means applicable to short or long-stem, old or new, merely by changing the size of the bore of the adapter, and having an incorporated feature which will strike the consciousness of the individuals operating the same in such a way that they will not open the faucet and burn themselves.

Other objects and advantages of the invention will be apparent from the following description taken in conjunction with the accompanying drawings wherein:

FIG. 1, a fragmentary section through a portion of a stove taken substantially along the axis of a gas control valve stem and showing the housing enclosing the valve and the conventional operating handle mounted on the valve stem exteriorly of the housing;

FIG. 2, a similar fragmentary showing with the valves stem cut into two sections with a sleeve having internal teeth mounted on one stem section which also has the operating handle on such section and a cooperating collar having external teeth mounted on the other stem section and a spring urging the sleeve and collar out on operating section so that the operating handle is free to rotate without operating the valve.

FIG. 3, a transverse section taken substantially on line 3—3 of FIG. 2 showing the internal tooth structure in the sleeve;

FIG. 4, a similar fragmentary section in which the sleeve and collar are mounted on the valve stem section permanently connected to the valve and the handle stem section respectively and a position indicating dial secured to the sleeve and prevented from contact with a person by an enclosing cup receiving a window fixed on the handle so that the valve must be operated through the sleeve and collar by axial movement of the handle;

FIG. 5, a front view of the dial taken substantially along broken line 5—5 of FIG. 4;

FIG. 6 is an axial section through another modification of the invention in which the conventional valve stem is cut transversely with the handle remaining on one section of the valve stem and the other section of the valve stem being connected to the usual valve head, the figure showing the structure in non-operating relation;

FIG. 7 is an axial section similar to FIG. 6 showing the parts in operative relations; and FIG. 8 is an exploded view showing the parts of the modification of FIGS. 6 and 7 in disassembled relation on a reduced scale.

Figure 1:
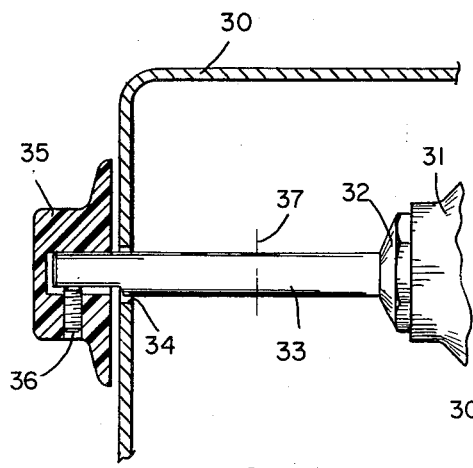

Briefly stated, the present invention is a faucet adapter applicable to the operating stem of a faucet constructed with an operating knob or handle for engaging the stem and rotating the same to open the faucet, but normally held disengaged.

The adapter contains spaced internal lugs or projections for cooperative engagement with external lugs or projections on a collar fixed to the stem of the faucet and with cooperative lugs or projections held out of engagement axially by means of a coiled spring.

A modification of the invention provides for mounting directly on existing valve stem structure with the usual handle remaining fixed. The valve stem is cut intermediate the handle and the valve body and a sleeve having a counterbore is mounted on one stem section and a collar is mounted on the other stem section said sleeve and collar having cooperating teeth with a spring normally biasing the sleeve and collar out of contact so that rotation of the operating handle does not operate the valve unless a definite axial movement is applied to the handle causing the teeth to positively interengage so that subsequent rotary movement will rotate the valve to open or close the valve.

Referring more particularly to FIGS. 1 to 5 of the drawing a housing 30 such as a housing of a gas stove or the like covers a valve body 31 having the usual packing 32 for the usual valve stem 33 projection therefrom with such stem projecting outwardly through aperture 34 from the housing 30. An operating handle 35 secured to the outer end of the valve stem by an Allen head screw 36 threaded through the handle 35 and engaging a flat surface on stem 33 provides for the usual operation of a valve in the conventional manner.

With this conventional structure the valve is operated directly by the handle and children can easily turn on the gas which could result in asphyxiation and/or fire. Such handle may be on a water faucet and operation by a child could result in damage or injury from hot water or even drowning.

Applicant makes a cut directly through the valve stem 33 at an intermediate location as indicated by line 37 by a conventional hack saw thereby producing two stem sections 33A and 33B, the conventional operating handle 35 being left in position on the outer section 33B.

Figure 2:
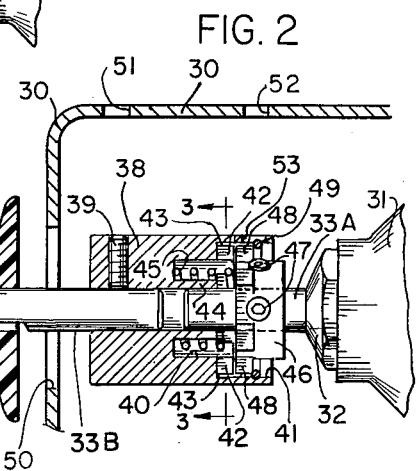
Figure 3:
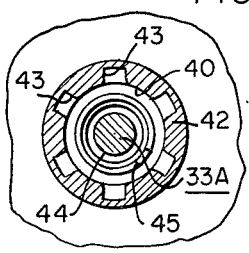

A counterbored sleeve 38 is secured to the stem section 33B FIG. 2 by an Allen head screw 39 the sleeve extending toward and overlapping the stem section 33A a substantial distance, the counterbore portion 40 being substantially smooth and the counterbore portion 41 being substantially larger than portion 40 with the bottom radial portion of the counterbore 41 being provided with complementary clutch teeth 42 leaving radial slots 43 therebetween. A hub portion 44 defines the inner wall of counterbore 40 and serves as a guide for sleeve 38 and slidably and rotatably engages the stem section 33A the hub 44 also serving to confine a compression spring 45 in operative position between the sleeve 38 and collar 46 secured by Allen head screws 47 to the stem section 33A as shown in FIG. 8. The collar 46 has a central bore which snugly receives the stem section 33A and has radially projecting teeth 48 of a size to be received in slots 43 of the sleeve. The teeth 48 of the collar are spaced from teeth 42 of the sleeve by the action of spring 45 thereby normally permitting free relative rotation. The teeth 48 of the collar serve as a stop which co-act with a split ring 49 received in a groove in the inner periphery of the counterbore 41 to maintain the collar in cooperative relation with the sleeve 38 while permitting relative axial movement of the collar with respect to the sleeve against the bias of spring 45.

To apply the sleeve and the collar, the housing 30 is provided with an enlarged opening 50 which permits the axial insertion of sleeve 38 and collar 46 and two tool receiving apertures 51 and 52 for alignment with Allen head screws 39, and 47, the sleeve 38 being provided with one or more apertures 53 in alignment with apertures 52 to provide for operating screw 47 securing the collar 46 to the stem portion 33A.

Figures 4, 5:
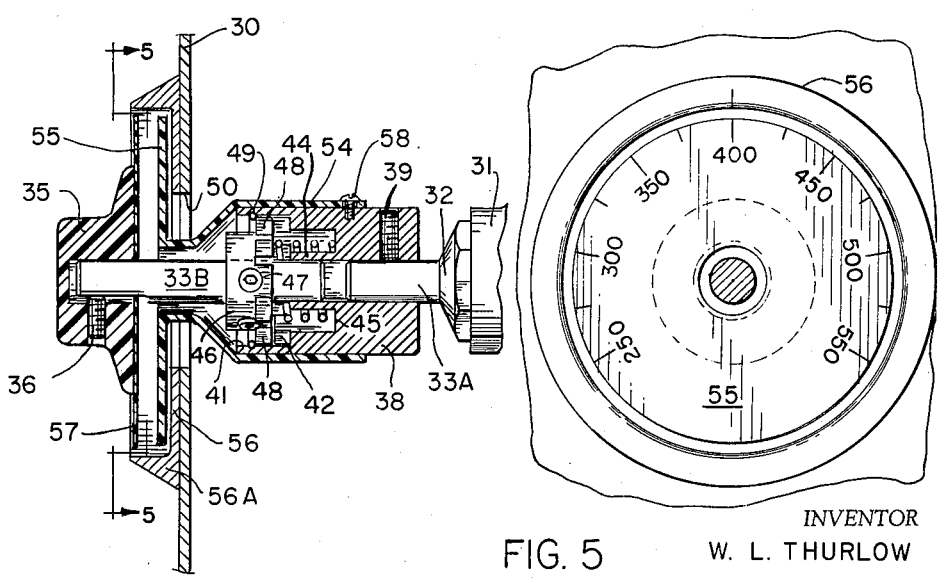

Upon reference to FIGS. 4 and 5 it will be noted that the sleeve 38 is mounted on the valve stem section 33A and the collar 46 is mounted on the stem section 33B but the action is essentially the same as previously described. A tubular member 54 is mounted on the sleeve 38 and passes outwardly through the opening 50 in the housing carrying a position indicating dial 55 having markings thereon to indicate the temperature of an oven for example. The dial 55 is received in a dish-shaped member 56 secured to the housing 30 in any suitable manner so the peripheral wall 56A of such dish-shaped member receives the dial 55. Secured to the valve handle 35 is a transparent disc or plate 57 overlying the indicating dial 55 thereby preventing contact of a person's fingers with the indicating dial to prevent operation of the valve by preventing the dial serving as a handle therefor.

The tubular member 54 is secured to the sleeve 38 by any suitable means such as screw 58 access to which may be obtained through aperture 51 or 52 shown in FIG. 2. Cooperating apertures are provided in the tubular member 54 to register with apertures 53 of the sleeve to provide access to the retaining screws 47.

From the above description it will be apparent that applicant has provided means to operate a shaft through a sleeve having internal teeth and a collar with external teeth by using the handle normally on the shaft. The modification is made by a single cut through the shaft. The shaft shown in the drawings may be a shaft of an electric switch or other shaft operated device and this invention provides for shaft operation which protects children from injury and also protects equipment from being operated by children.

Upon reference to FIGS. 6 to 8 a modification of the invention is shown to include a valve stem having one section 60B carrying the usual handle 61 fixed thereto which section 60B is separated from the other section of the valve stem 60A which is connected to the usual valve head of a valve (not shown) for operating the valve in the usual manner. Mounted on the one section 60B of the valve stem is a generally cylindrical hub 62 having a central bore 63 therethrough and a radially extending flange 64 forming a counterbore 64A at one end, said radially extending flange having equally spaced notches along its outer periphery forming teeth 65. The hub 62 is secured to the said one valve stem section 60B by an Allen head set screw 66 threadedly received in a radially extending aperture in the hub and in clamping engagement with the valve stem section 60B.

Slidably and rotatably mounted on the hub 62 in supporting relation is a sleeve 67 having a radially inwardly extending bearing flange 68 at one end thereof with a bore which rotatably and slidably receives the hub 62, the sleeve having an internally threaded radial aperture 69 for receiving a set screw 70 for a purpose to be later described.

Positioned within the sleeve and abutting and centered at one end by the counterbore 64A of the hub 62 is a spirally coiled spring 71 which has its maximum outside diameter appreciably less than the inside diameter of the sleeve 67. The spring 71, which is freely movable and operative in the sleeve 67, is received in its opposite end within a counterbore 72A of the cup-shaped member 72. The cup-shaped member 72, having an axial bore 73 therethrough, is fixedly mounted on the said other valve stem section 60A by a set screw 75 received in a threaded radial aperture 74 in the cup-shaped member and clamping against the valve stem section 60A. The cup-shaped member 72 has notches formed in the peripheral lip or cylindrical flange 77 thereof forming teeth 76 of a size to be received in the notches of hub 62 and similarly the teeth 65 of hub 62 may be received in the notches formed between the teeth 76 of the cup-shaped member 72 so as to drivingly inter-engage therewith. The notches forming teeth 76 in the cup-shaped member 72 do not extend to the internal bottom of the cup so that a portion of the cylindrical flange 77 is free of notches for freely and unobstructingly receiving the large diameter end of the spiral spring 71 as clearly seen in FIGS. 6 and 7 thereby avoiding any positive interengagement of the spiral spring 71 and cup-shaped member 72.

To assemble parts in operative relation, the sleeve 67 which fits snugly on the cup-shaped member 72 is rigidly secured thereto by the set screw 70 threaded through the threaded radial aperture 69 in the sleeve 67 and into the threaded radial aperture 74 in the cup-shaped element 72 and in overlying relation to set screw 75 thereby maintaining both parts 67 and 72 in assembled supported relation to function as a unitary structure with the spring 71 normally maintaining the sleeve flange 68 in abutment with the side of the teeth 65 of the hub and the teeth 65 out of engagement with the teeth 76 of the cup-shaped member as shown in FIG. 6. Under these conditions rotation of the handle 61 has no effect on the said other valve stem section 60A fixed to the valve head so there can be no danger of inadvertent operation of the valve stem by children or others having insufficient knowledge of the dangers involved.

To operate the valve the operator intentionally grasps the handle 61 and pushes such handle in an axial direction toward valve stem section 60A thereby overcoming the action of spring 71 and causing the hub 62 to slide within the sleeve 67 of the unit 67, 72 to the position shown in FIG. 7 where the teeth 65 of the hub inter-engage with the teeth 76 of the cup-shaped member. Sequential rotation of the handle 61 causes a corresponding rotation of valve stem section 60A and thereby operation of the valve.

From the above description it will be apparent that the structures of the several modifications of the invention provide for a minimum modification of existing valves so that by using a multi-section valve stem or cutting a valve stem and using a sleeve and interengaging toothed elements on the valve stem sections as shown in FIGS. 1 to 4 and in the modification of FIGS. 6 and 8, the advantages of the present invention can be readily obtained by relatively unskilled persons.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. The combination with a valve having a valve stem in two sections one section of said valve stem having the operating handle fixed thereto and the other section connected to the valve, a hub of uniform diameter throughout its major extent and having a circular flange at one end thereof, said hub being mounted by means of a set screw on said one section of said valve stem, said flange of said hub having notches formed therein providing teeth between the notches with the notches terminating radially outwardly of the outer periphery of the hub, a sleeve having an inwardly extending flange at one end thereof surrounding and mounted on said hub with said inwardly extending flange of said sleeve in cooperative rotatable relation with said hub and the internal diameter of the inwardly extending flange of said sleeve being substantially the same as the external diameter of said hub, the internal diameter of the remaining portion of said sleeve being sufficiently large to freely receive the notched and toothed flange of said hub, a cup-shaped element having a peripheral lip and fixed to the other section of said valve stem by a set screw, said cup-shaped element having notches and teeth formed in the periphery of its lip for receiving the teeth and notches respectively of the flange on said hub, additional set screw means for securing said cup-shaped member to said sleeve preventing relative axial and rotational movement between said sleeve and said cup-shaped member while maintaining said hub, said sleeve, and said cup-shaped member in assembled relation, spiral coil spring means reacting between the hub and said cup-shaped member normally urging said hub with the teeth thereon out of engagement with the cup-shaped member whereby the valve may be operated by axial movement of the handle and of said one section of said valve stem relative to the other section of said valve stem connected to the valve, and the valve can be operated only when the teeth of said hub engages the teeth of said cup-shaped member.

2. An attachment for providing safety operational control between two aligned and spaced shaft sections, comprising hub means having a circular periphery, said hub means having an axial bore therein for the mounting thereof on one of the shaft sections adjacent its spaced end, said hub means having a concentrically positioned recess therein at the spaced end thereof, a radially enlarged flange on said hub means in the plane of and surrounding said recess, radially and longitudinally extending teeth formed in said flange, means to secure said hub means on said one shaft section adjacent said spaced shaft ends, sleeve means secured on the spaced end of the other aligned shaft section and having a counterbore formed therein, said counterbore facing said hub means and having a peripheral lip with complementary radially extending teeth formed therein in alignment with the teeth of said hub means for clutching inter-engagement therewith, comopression spring means interposed between the spaced ends of said shaft sections and seated at its opposite ends in said recess and the bottom of said counterbore, a radially inwardly extending bearing flange on said sleeve means disposed beyond said peripheral lip and in bearing contact with the periphery of said hub means and constituting means to solely support the hub means, said inwardly extending bearing flange forming an enclosure in said sleeve means, compression spring means seated and centered at its ends in the recess of said hub means and said counterbore of the sleeve means, respectively, said spring means normally maintaining said teeth on said hub and sleeve means out of operative inter-engagement whereby only rotational force applied to one shaft section cannot rotate the other shaft section.

3. Safety actuating mechanism for universal application in preventing unintentional actuation of a conventional rotary type valve having a pair of axially aligned and spaced apart cylindrical valve stem sections wherein one of said stem section is connected with the valve and the other stem section has an operating handle thereon, sleeve means having an axial bore whereby it is rotatable on and about the axis of the valve stem sections, said sleeve means including means whereby it is rotatable with one of said cylindrical stem sections of the valve, said sleeve means having axial counterbore means therein forming a diametral wall therein intermediate the length of the sleeve means, clutch teeth means integral with said diametral wall within the larger bore portion of said axial counterbore means, said clutch teeth means extending radially and in a longitudinal direction of the sleeve means and spaced inwardly of the outer peripheral surface thereof, collar means, said collar means being removably mounted on and rotatable with the other of said cylindrical valve stem sections and in axial alignment with said sleeve means, one of said sleeve and collar means comprising the sole support of the other, said collar means having clutch teeth formed on the outer periphery and terminating at one end thereof, said collar clutch teeth being complementary to the clutch teeth of said sleeve means and positioned within said larger bore portion of the counterbore thereof, said larger bore of the counterbore of said sleeve means being of a sufficient length to provide for relative axial movement of the teeth of the collar means between an inter-engaged position with said teeth of said sleeve means and a rotatably free disengaged position therein, spring means of a diameter greater than said cylindrical stem sections and disposed inwardly of said inter-engageable clutch teeth of said sleeve and said collar means reacting between said sleeve means and said collar means normally to bias said sleeve means and collar means in an axial direction to maintain said inter-engageable clutch teeth means apart in a disengaged relation, means at the end of said larger bore portion of the sleeve counterbore normally abuttingly engaged by the clutch teeth means on said collar means to maintain said collar clutch teeth means confined within said larger bore portion and to maintain the safety actuating mechanism in assembled relation, said safety mechanism being operative when axial and rotational pressure is sequentially applied to the handle stem section of the valve to first overcome the biasing action of said spring means to relatively axially move said sleeve means and said collar means to effect interengagement of said inter-engageable clutch teeth means and then rotate the valve stem to effect valve activation.

4. The invention according to claim 3 in which an indicating device is attached to the one of said sleeve and collar attached to the valve stem to indicate the position of the valve stem regardless of the position of the handle.

5. Safety operating mechanism as defined in claim 3 wherein said sleeve means includes a central hub portion within the smaller bore portion of said axial counterbore means thereof extending towards said collar, said central hub portion rotatably receiving said other valve stem section, said spring means disposed in surrounding relation to said hub and within said sleeve means, said spring means engaging the inner end of said sleeve counterbore and an aligned adjacent portion of said collar means, an indexing dial device comprising a tubular portion mounted on said sleeve means and projecting to adjacent the operating handle on said other stem section, a dial mounted on said tubular portion to indicate the position of said sleeve and thereby the position of the valve, a dish-shaped member mounted with respect to the body of the valve and encompassing said dial, and a transparent disk on the handle permitting observation of the dial, said transparent disk lying within said dish-shaped member thereby covering said position indicating dial while permitting observation of said dial and preventing manual contact therewith.

6. Safety actuating mechanism as defined in claim 3 wherein said sleeve means includes said axial bore for mounting one of said valve stem sections thereon, a central hub portion within said axial counterbore means thereof disposed co-axially of said axial bore in said sleeve means, said central hub portion providing the sole bearing support means for mounting said collar in freely rotatable relation with respect to said sleeve means, said spring means being disposed in surrounding relation to said hub portion and confined in operative position thereby.

7. Safety actuating mechanism as defined in claim 3 wherein the periphery of said collar means includes a portion of cylindrical shape, said means at the end of said larger bore portion of said sleeve counterbore which is normally abuttingly engaged by the clutch teeth means on said collar means comprising a radially inturned flange having an axial bore therein extending in rotatably contacting support relation to said collar means, said radially inturned flange providing the sole bearing means between said axially aligned and spaced apart cylindrical valve stem sections.

8. Safety actuating mechanism as defined in claim 3 wherein the smaller portion of said counterbore means in said sleeve means includes an elongated hub within the smaller portion of said counterbore means disposed co-axially of and adjacent the axial bore in said sleeve means, and said spring means being disposed in surrounding relation to said hub within said smaller portion of said counterbore means of said sleeve means and confined operative position thereby.

9. Safety actuating mechanism as defined in claim 3 wherein said sleeve means and said collar means each include an axial bore providing mounting means therefor on said axially aligned and spaced apart valve stem sections, said collar means being fixedly secured on one of said stem sections at a point spaced from the end of said one valve stem section, said other valve stem sections having an end fixedly secured in one end of said sleeve axial bore, said one valve stem section being slidably and rotatably supported in the other end of said sleeve bore in spaced relation to the fixed end of said other valve stem section therein, an elongated hub within the smaller portion of said counterbore of said sleeve means disposed adjacent the said axial bore therein, said spring being mounted in said smaller counterbore portion and in surrounding relation to said elongated hub.

10. A safety operating mechanism adapted for use with a rotary type valve, said mechanism including shaft means comprised of two axially aligned corresponding shaft portions spaced from each, handle means adapted to be mounted on the end of one of said shaft portions remote from said mechanism, the remote end of the other of said shaft portions being adapted for connection to a rotary valve member, collar means fixedly mounted on one of the adjacent ends of one of said shaft portions, the major portion of the outer surface of said collar being cylindrical and having radially outwardly and longitudinally extending clutch teeth disposed thereon and extending to the end thereof adjacent said spaced shaft ends, sleeve means rigid with the adjacent end of the other of said shaft portions and in slideably confining and support relation to said collar means thereby providing for the sole support of one of said shaft portions, said sleeve means having at least two concentric bore portions of different diameters axially offset and open to each other to form a radially extending wall therebetween, clutch teeth complementary to said first-mentioned teeth on said radial wall between said two bore portions, said collar clutch teeth being positioned within the larger bore portion of said sleeve means, said sleeve means including means permitting relative axial movement of the tooth collar therein but preventing withdrawal therefrom, and spring means interposed between said collar means and said sleeve means and spaced outwardly of said shaft portions, said spring means being compressed when the two shaft portions are relatively moved toward each other to effect inter-engagement between the clutch teeth of said collar and said sleeve means for effecting valve actuation, said compressed spring means effecting relative separation of said shaft portions to disengage said inter-engaged clutch teeth when the two shaft portions are free to relatively move apart.

11. A safety faucet adapter mechanism adapted for preventing unintentional actuation of a conventional rotary type valve comprising two axially aligned shaft sections of substantially equal diameter having their adjacent ends spaced from each other, cylindrical collar means fixedly mounted on one of said shaft sections near said spaced shaft ends, projections on the cylindrical periphery of said collar means extending to one end thereof, sleeve means fixedly mounted on the end of the other shaft section and having an open end, said sleeve means being in rotatable mounting relation on the adjacent end of said one shaft section, said sleeve means having at least two concentric counterbores forming a radially extending wall therebetween, projections extending from said radially extending wall for driving engagement with said projections on said collar means, said collar means being positioned within the larger counterbore of said sleeve means for axial movement therein, means positioned within the open end of said larger counterbore preventing withdrawal of said projections on said collar means from said larger counterbore, concentric compression spring means seated in the smaller counterbore of said sleeve means and spaced outwardly of said shaft sections and bearing against said collar means to normally yieldingly maintain said projections out of inter-engagement, said spring being compressed when the two shaft sections are relatively moved towards each other to effect engagement of said projections on said collar means and said sleeve means, said compressed spring means effecting relative separation of said shaft sections to disengage the driving engagement of said projections when the shaft sections are free to move relatively apart.

References Cited by the Examiner

UNITED STATES PATENTS

| | | | |
|---|---|---|---|
| 893,184 | 7/08 | Mercer | 251—77 XR |
| 2,284,996 | 6/42 | Stuckenholt | 251—96 |
| 2,555,593 | 6/51 | Lee | 192—67 XR |
| 2,603,325 | 7/52 | Pickard | 192—67 |
| 2,829,538 | 4/58 | Mueller | 251—96 XR |

M. CARY NELSON, *Primary Examiner.*

ISADOR WEIL, *Examiner.*